United States Patent
George-Svahn et al.

(10) Patent No.: US 9,817,474 B2
(45) Date of Patent: Nov. 14, 2017

(54) GAZE DRIVEN INTERACTION FOR A VEHICLE

(71) Applicant: Tobii AB, Danderyd (SE)

(72) Inventors: Erland George-Svahn, Solna (SE); Rebecka Lannsjö, Solna (SE); Mårten Skogö, Danderyd (SE)

(73) Assignee: Tobii AB, Danderyd (SE)

( * ) Notice: Subject to any disclaimer, the term of this patent is extended or adjusted under 35 U.S.C. 154(b) by 0 days.

(21) Appl. No.: 14/605,647

(22) Filed: Jan. 26, 2015

(65) Prior Publication Data

US 2015/0234459 A1 Aug. 20, 2015

Related U.S. Application Data

(60) Provisional application No. 61/931,364, filed on Jan. 24, 2014.

(51) Int. Cl.
*G06F 3/01* (2006.01)

(52) U.S. Cl.
CPC .................... *G06F 3/013* (2013.01)

(58) Field of Classification Search
CPC ..... G06F 3/013; G09G 3/3406–3/3426; G09G 2320/0626–2320/0653
USPC ..................... 345/102, 156–158; 349/61–69; 362/97.1–97.4; 701/1–34.4; 715/863
See application file for complete search history.

(56) References Cited

U.S. PATENT DOCUMENTS

| | | | |
|---|---|---|---|
| 2010/0156617 A1 | 6/2010 | Nakada et al. | |
| 2011/0169625 A1 | 7/2011 | James et al. | |
| 2013/0024047 A1* | 1/2013 | Kalhous | G06F 3/013 701/1 |
| 2014/0258942 A1* | 9/2014 | Kutliroff | G06F 3/017 715/863 |
| 2014/0313120 A1* | 10/2014 | Kamhi | G06K 9/00604 345/156 |
| 2014/0361971 A1* | 12/2014 | Sala | G06F 3/041 345/156 |
| 2014/0372944 A1* | 12/2014 | Mulcahy | G06F 3/04815 715/810 |
| 2015/0210292 A1 | 7/2015 | George-Svahn et al. | |

FOREIGN PATENT DOCUMENTS

IL   WO 2013154561 A1 * 10/2013  ......... G06K 9/00604

OTHER PUBLICATIONS

Non-Final Office Action for U.S. Appl. No. 14/605,677, dated Oct. 1, 2015, 13 pages.
U.S. Appl. No. 14/605,677, Notice of Allowance dated Oct. 13, 2016, 13 pages.
Final Office Action for U.S. Appl. No. 14/605,677, dated Jun. 2, 2016, 19 pages.

* cited by examiner

*Primary Examiner* — Michael Pervan
(74) *Attorney, Agent, or Firm* — Kilpatrick Townsend & Stockton LLP

(57) ABSTRACT

According to the invention, a method for changing information on a display in a vehicle based on a gaze direction of a driver is disclosed. The method may include displaying information on the display in the vehicle. The method may also include receiving gaze data indicative of the gaze direction of a user. The method may further include changing the display based at least in part on the gaze data.

17 Claims, 4 Drawing Sheets

GAZE DRIVEN INTERACTION FOR A VEHICLE

CROSS-REFERENCE TO RELATED APPLICATIONS

This application claims priority to Provisional U.S. Patent Application No. 61/931,364 filed Jan. 24, 2014, entitled "GAZE DRIVEN INTERACTION FOR A VEHICLE," entire disclosure of which is hereby incorporated by reference, for all purposes, as if fully set forth herein.

BACKGROUND OF THE INVENTION

Embodiments of the present invention generally relate to systems and methods for gaze driven interaction, and in particular, to systems and methods for gaze interaction for automobiles and other mobile vehicles.

Interactions with personal computers and the like have developed substantially, from the traditional computer mouse and keyboard to new modalities such as touch, gesture, and gaze driven inputs.

Concurrently to this development, automobiles and other mobile vehicles have increasingly contained more technology, in the form of safety systems, entertainment systems, and the like.

It has been previously proposed to use eye tracking and the like to monitor driver behavior for safety reasons. For example, see U.S. Pat. No. 8,314,707 assigned to Tobii Technology AB whereby an eye tracking or monitoring device is used to determine a drowsiness level of a vehicle driver, based on closing of the driver's eyelids. U.S. Pat. No. 8,314,707 is hereby incorporated by reference, for all purposes, as if fully set forth herein.

A problem exists with current technology in automobiles and other mobile vehicles whereby a user must physically interact with the technology, thereby distracting them from devoting available physical and mental resources from controlling the vehicle. For example, in an automobile comprising a touch enabled central control system, a user must physically touch the display in order to control the unit, possibly even diverting their attention from the road to do so. Controls may also be enacted by physical buttons or the like on the central control system, or on the steering wheel of the automobile.

Typically, such systems requiring interaction from the user are placed on the central console of an automobile or mobile vehicle. This requires the user to look away from the road or environment surrounding the vehicle for intermittent and/or prolonged periods in order to make adjustments or give commands to the system.

One goal of embodiments of the present invention is to provide systems and methods which minimize and/or alleviate the need of a user to devote mental resources to, and/or physically interact with, technology based systems in a moving vehicle.

It is a further goal of embodiments of the present invention to provide systems and methods that allow a user to control a control system of a vehicle through gaze interaction, whereby after gaze interaction the user may continue to control the control system with minimal requirement to provide further gaze interaction, and/or further gaze at the control system. It is a further goal of embodiments of the present invention to provide systems and methods that allow a user to interact with a control system through gazing at items and/or locations within a vehicle.

This and other goals and advantages of embodiments of the present invention will be made apparent from the description, figures, and claims provided herein.

BRIEF DESCRIPTION OF THE INVENTION

In one embodiment, a method for changing information on a display in a vehicle based on a gaze direction of a driver is provided. The method may include displaying information on the display in the vehicle. The method may also include receiving gaze data indicative of the gaze direction of a user. The method may further include changing the display based at least in part on the gaze data.

In another embodiment, a non-transitory machine readable medium having instructions stored thereon for changing information on a display in a vehicle based on a gaze direction of a driver is provided. The instructions may be executable by at least one processor for at least displaying information on the display in the vehicle. The instructions may also be executable for receiving gaze data indicative of the gaze direction of a user. The instructions may further be executable for at least changing the display based at least in part on the gaze data.

In another embodiment, a system for changing information on a display in a vehicle based on a gaze direction of a driver is provided. The system may include an eye tracking device and a processor. The eye tracking device may be for receiving gaze data indicative of the gaze direction of the driver. The processor may be for causing the display the be changed based at least in part on the gaze data.

BRIEF DESCRIPTION OF THE DRAWINGS

The present invention is described in conjunction with the appended figures.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

In some embodiments, a method may be provided for interacting with a control system in a moving vehicle. The method may include (1) receiving data from an eye tracking device; (2) determining, using said data, a gaze direction of a user; and (3) based on said gaze direction, providing a command to the control system.

An eye tracking device may be a device capable of detecting an orientation of a user's eye. In some embodiments, this may be achieved by emitting an infrared light towards a user's eye or eyes, and using an image sensor to capture an image containing a reflection or reflections of said infrared light. The image may then be analyzed by the eye tracking device, or a computing device connected thereto, to determine a gaze direction of a user.

Many commercial eye tracking devices are available from companies such as Tobii Technology AB. Further information regarding the functioning and characteristics of eye tracking devices may also be found in U.S. Pat. No. 7,572,008 assigned to Tobii Technology AB. U.S. Pat. No. 7,572,008 is hereby incorporated by reference, for all purposes, as if fully set forth herein.

In some embodiments, the eye tracking device may be located anywhere within a moving vehicle, such that it is capable of determining the gaze direction of a person within the moving vehicle, especially, but not limited to, the driver of the vehicle. In some embodiments, the eye tracking device may also be located such that it can also determine the gaze of passengers in the vehicle. In some embodiments, multiple eye tracking devices may be used to determine the gaze direction of multiple persons in the vehicle, and/or confirm determinations made by any particular eye tracking device.

Figure 1:
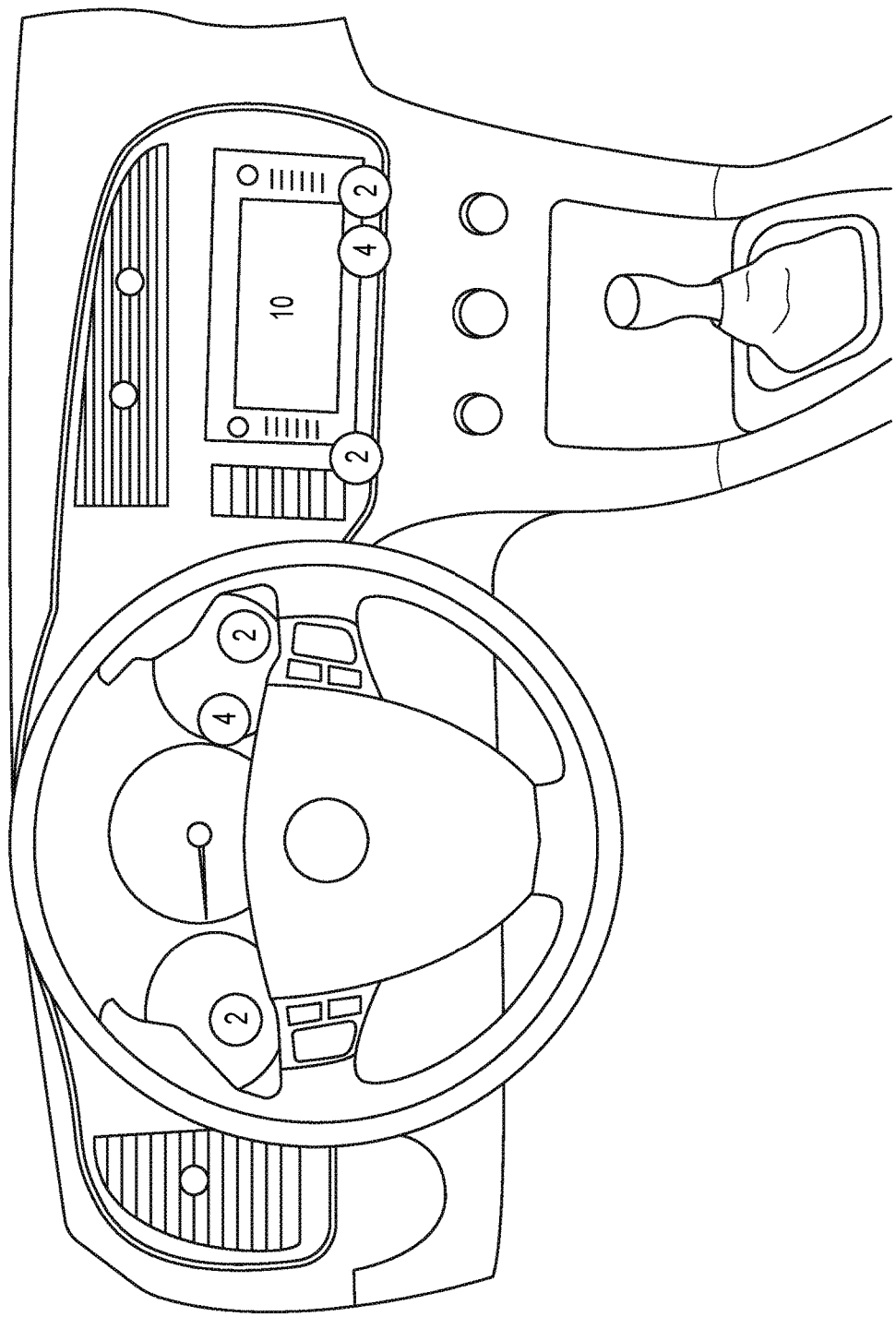
FIG. 1 shows a vehicle cabin comprising an eye tracking device suitable for use in embodiments of the present invention.

An example position of an eye tracking device, suitable for use in various embodiments, may be seen in FIG. 1, which shows an interior of a typical automobile. Locations for placement of infrared illuminators 2 and sensors 4 are shown by exaggerated markers to allow for easy identification and contrast with the image of the automobile interior. These are shown to demonstrate possible positions for these devices, which are then connected directly to a control system having a display 10, or to an eye tracking processing device (not shown). Any number of sensors 2 and illuminators 4 may be utilized to enact eye tracking according to embodiments of the present invention. It is intended that these may be placed in any configuration and/or location that allows for eye tracking of a user of a vehicle.

The embodiment shown in FIG. 1 allows for eye tracking of a driver of the automobile in a normal driving position as well as eye tracking of the driver or other user of the automobile using the control system.

In some embodiments, it is possible for the eye tracking device to include a processor to determine the gaze direction of a user, or it is possible for the eye tracking device to be connected to a computing device whereby the computing device determines the gaze direction of a user, based on information from the eye tracking device.

Typically, determination of the gaze direction is performed by locating the position of reflections of infrared light in an image captured by an eye tracking device. Based on properties of a user's eye and the location of reflections upon that eye in a captured image, a user's gaze direction may be determined.

By way of example, eye tracking methods and apparatus are described in U.S. Pat. No. 5,231,674 assigned to LC Technologies, Inc. U.S. Pat. No. 5,231,674 is hereby incorporated by reference, for all purposes, as if fully set forth herein. However, any known eye tracking device is suitable for use with embodiments of the present invention, in order to determine the direction of a user's gaze.

Upon determination of a user's gaze direction, a command may be determined for a control system. According to various embodiments, there are multiple methods of determining the command to provide to a control system. Three example embodiments are discussed below:

First example of a system/method for determining a command to provide to a control system based on a user's gaze Where a moving vehicle is provided with a physical input device such as a button, switch, movable wheel, touch screen or other physical input device, a determination of a command intended by a user's gaze may be based upon the function of the physical input device.

For example, a user may activate the input device before, during, and/or after gazing at a desired interaction point. Upon release of the physical input device, the point at which the user was/is gazing is used to determine the command for the control system.

Figure 2:
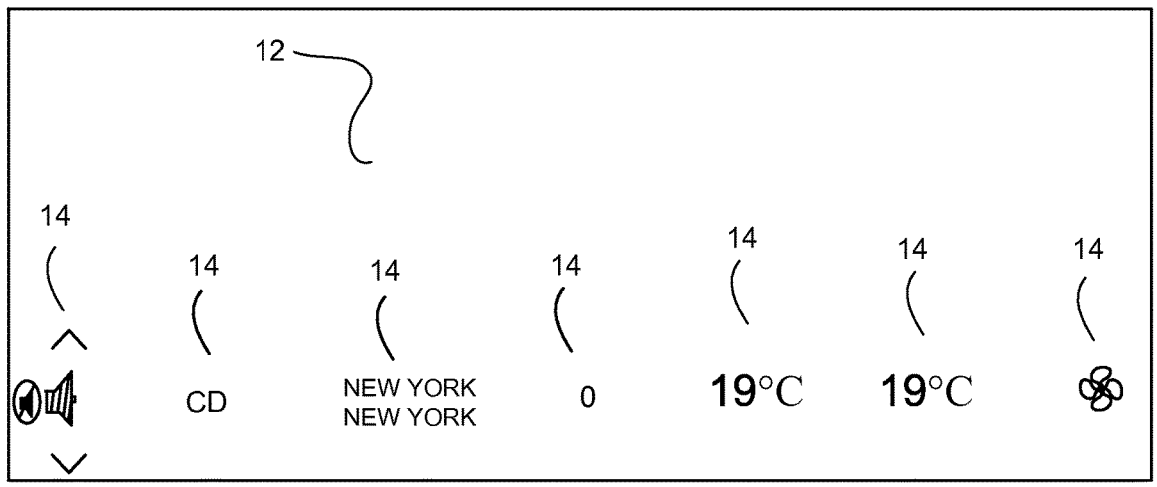
FIG. 2 shows a control system display which may be interacted with according to embodiments of the present invention.

Consider FIG. 2, showing an example of a control system display 12. According to some methods of determining the command intended by a user's gaze, a user may activate a physical input device, gaze at an icon 14 on the control system display 12 and upon a second activation of the physical input device, the command determined is based upon which icon 14 the user is or was gazing at.

Alternatively, the user may maintain activation of the physical input device and release activation whereby the command will be determined by which icon 14 the user is gazing at when activation is released.

Alternatively, the user may activate the physical input device after the user has gazed at the icon 14 he or she intends to interact with.

In some embodiments, visual and/or audio feedback may be provided which indicates which icon 14 the system/method has determined the user is gazing at. For example, the system/method may cause a visual indicator to appear on or near icon 14 during or after the user has gazed at the icon, or possibly after the system has determined the command to be performed. Alternatively, the system may audibly announce an indication of the perceived command.

Visual feedback may assist the user in understanding the effects of the command. In some embodiments, once a command has been determined to be performed, the user may alter the command using only the physical input device. In other embodiments, a user may alter the command using verbal or gaze-initiated commands.

By way of example, in some embodiments, a moving vehicle may be provided with an eye tracking device capable of determining the gaze direction of a driver of the moving vehicle. The eye tracking device may be connected to a control system having a display located in the center console of the moving vehicle.

The moving vehicle may be controlled at least partially by a steering wheel, in a traditional configuration. The steering wheel may include physical buttons capable of activation by the driver.

In some embodiments, the user may activate a button on the steering wheel by pressing the button. While holding the button down, the user gazes at a plurality of icons on the display, when the user selects which icon he or she wants to interact with, the user releases the button.

The control system may then determine, based on the user's gaze direction, which icon the user wants to interact with. Depending on the embodiment, the icon determined may be the icon gazed at when the button is first held down, the icon gazed at during holding of the button, or the icon gazed at during release of the button. In some embodiments, if multiple icons are gazed at, the system may determine which button was predominately gazed at (i.e., gazed at a majority of the subject time). The icon is then selected and its associated function related to the moving vehicle may then be altered by using the previously discussed button, and/or additional buttons on the steering wheel.

For example, the icon may be a temperature adjustment icon, whereby the user may press "up" or "down" arrow inputs on the steering wheel to adjust the temperature of air emitted by a climate system within the moving vehicle. Visual feedback may be utilized in the form of arrows above or below the icon illuminating when the user presses an "up" or "down" arrow. Audible feedback may also be provided.

Visual feedback may be provided in two forms, displayable either separately or concurrently. A first form, as previously described, highlights which item or area on a screen is currently selected for control by the control system. A second form highlights which item or area on the screen that is currently the subject of a user's gaze direction. In this manner, it is possible to control the control system after selection of an item via gaze direction, whilst still allowing the user to understand where his or her gaze direction is being detected.

For example, a first form of visual feedback for indicating which item is currently selected for control by the control system could be a "checkmark" graphic or icon which would appear next to an icon; while a second form of visual feedback for indicating where the system detects the user's gaze direction could be a "eyeball" graphic or icon which would appear wherever the user's gaze is directed.

Figure 3:
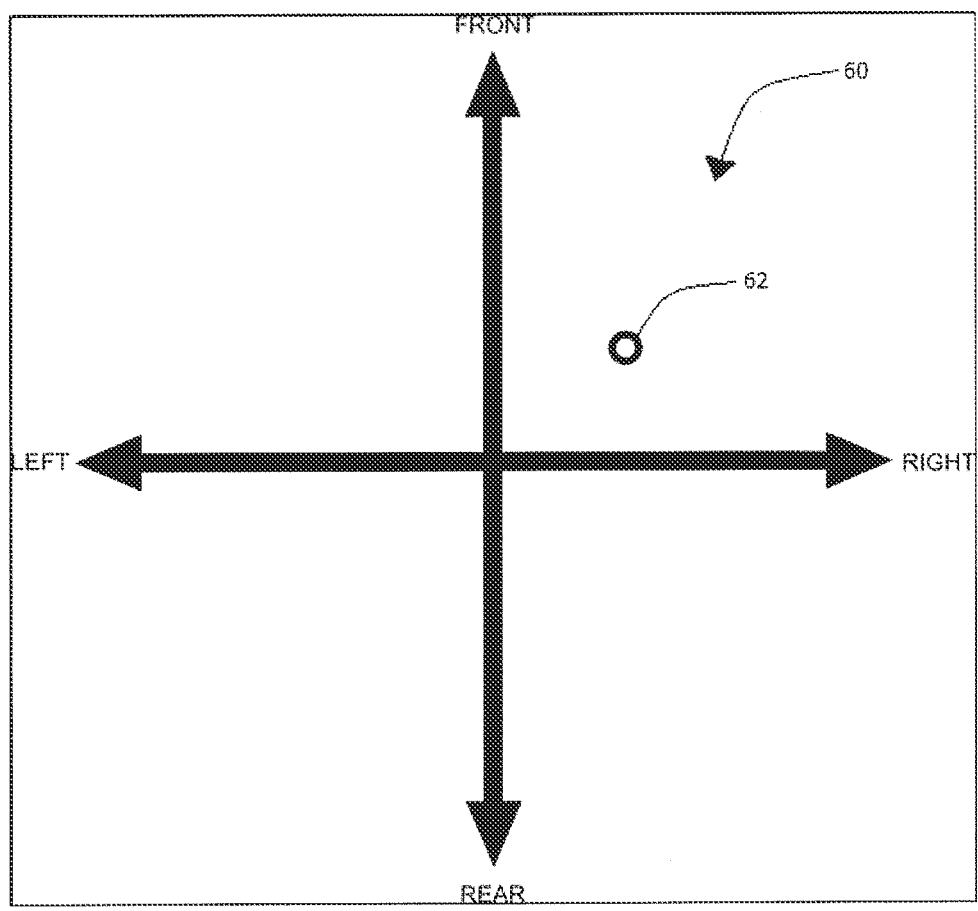
FIG. 3 shows an item displayable on a control system display which may be interacted with according to the present invention.

Second example of a system/method for determining a command to provide to a control system based on a user's gaze A user may control the control system by looking directly at a displayed item on a display. This may be particularly relevant to control multiple systems with one gaze direction. Consider, by way of example, FIG. 3. FIG. 3 shows an image 60 displayable on a control system display which allows a user to control items conventionally known as "fade" and "balance" in a vehicle audio system. Adjusting fade and balance allows a user to adjust the position within the vehicle that audio is emitted from. Consider that speakers are placed in four corners of the cabin of the vehicle, the user may adjust audio levels from each speaker so as to provide for more or less sound from each speaker, front versus back, and left versus right.

In some embodiments, a user may gaze at the exact location on image 60 representing the desired audio fade/balance output. Upon determination of the user's gaze direction, the system may provide a visual indicator 62 representing the user's gaze direction.

In the example shown in FIG. 3, the user has selected an audio configuration whereby audio will be emitted primarily from the front right hand side of the vehicle. In this way two systems capable of being controlled by the control system have been altered through a gaze direction. In the current example, the two systems are balance and fade controls of an audio system. However, this method is also applicable to other controllable systems such as a temperature setting of a vehicle.

Depending upon the systems controlled by the control system, it may be necessary to gaze at multiple locations to set multiple parameters or controls of systems. For example, a control system display may show many climate settings such as temperature, fan speed, zone temperature, direction of air, origin of air etc. A user may gaze at different locations on the display representing commands to modify different aspects of these settings.

Second example of a system/method for determining a command to provide to a control system based on a user's gaze In some embodiments, systems and methods disclosed herein may allow for commands to be provided to a control system whereby the user does not gaze at a display. The eye tracking device may be capable of determining a user's gaze direction relative to any item within a moving vehicle. As such, gazing at a particular item may be interpreted by the control system as intent to adjust a function associated with that item.

For example, a user may gaze at a radio if he or she wishes to adjust the volume of the radio, or at an air grille if he or she wishes to adjust the temperature of air emitted by the vehicles climate system, and/or the particular air grille gazed at.

In this manner, the method of determining the command may comprise analyzing a user's gaze direction when an input device is activated or deactivated. Based on the item within the moving vehicle at which the user is gazing, the control system may execute a command. In these or other embodiments, once a user has utilized a gaze direction to select a system to control via the control system, the system remains controllable by the user until another system is selected. For example, if a user gazes at an item on a display or other item within a vehicle to select a system for control such as temperature, audio, or other system, that system is controllable through the control system until another selection is made by the user. In this manner, the user may select a system such as a stereo and make adjustments through manual controls such as buttons, touch screen, rotatable knobs and the like to parameters such as volume, treble, bass, station selection, track selection etc. Verbal or gaze commands could also be used to perform these functions after selection of the system via the user's gaze.

In some embodiments, audible or haptic feedback may be provided to enhance control of a control system. In this manner, the feedback may assist in allowing the user to understand when he or she is controlling the control system. For example, once a user has selected a system for control using their gaze direction they may alter the control via buttons or the like. These buttons, and/or associated systems, may provide haptic or audible feedback, and provide input mechanisms such that the user may alter control of the selected system without directing their gaze away from other portions of the environment.

Further improvements may be provided in some embodiments. For example, a physical input device may be provided to enable the control system to access the eye tracking device. This may assist in allowing the user to control when he or she intends on using gaze direction to issue commands to the control system.

Further, the control system display need not be a display in the manner of a liquid crystal or similar display. Given that the present invention may function through determination of a gaze direction towards any feature in a vehicle, in some embodiments the control system display may be illuminated or non-illuminated portions of a dashboard and/or other portion of the interior or exterior of the vehicle. In these embodiments, the illumination of the dashboard or any particular portion or more of the instrument panel may be configured to be at one lighting level when the user is not looking at it, but at a greater lighting level when the user is looking at it. For any particular portion, or the entirety, of such panel, the panel may only be dimmed when the system is sure the driver is not observing the panel. This is to ensure the safest condition (high illumination for readability/viewability) is the default condition. Thus, a receipt of gaze data indicating an affirmative driver gaze on a non-panel location may be necessary prior to dimming of the panel (or portion thereof).

Further, when a control system display is utilized, a gaze direction need not be determined to be directly at an icon or other displayed area on the display. Rather, the system may determine that a gaze direction within a threshold distance of a displayed item is sufficient to enact a command. This allows the system to function when a gaze is not directly located on a displayed item due to haste of the user, system error, and/or noise effecting the determination of the gaze direction.

The control system may be in communication with remote devices such as telephones, servers, and/or the internet. It is intended that some embodiments of the present invention provide gaze driven interaction for data obtained from these devices. For example, the control system may utilize maps downloaded from the internet for a navigation system of a vehicle. The navigation system may be interacted with based on gaze direction as previously described, including searching for locations, setting destinations, and/or requesting directions from the navigation system.

In some embodiments, a system may be provided for interacting with a vehicle using gaze as per any of the methods previously described. The system may include an eye tracking device connected to a control system of a vehicle. The control system may be capable of controlling an item within a vehicle such as a climate unit, stereo, telephone, television, safety systems, on board computer, etc. The eye tracking device may be connected via traditional wiring such as USB or the like, or may alternatively be wirelessly connected to the control system through Bluetooth or any other suitable wireless connection as would be understood by a person skilled in the art.

In some embodiments, the control system may receive a gaze direction from the eye tracking device without some other indication of intent from a user. This may still allow the control system to perform functions and control systems without active interaction from the user. For example, the control system may determine that the user has gazed at a message displayed on display such as a service message and thus remove the message from the display.

Metrics for determining, from gaze information, whether a user has viewed a message or notification on a display may include specific gaze dwelling times on the display/message/notification and/or a particular gaze pattern (e.g., scanning a message from left to right, thereby indicating reading of the message is occurring). Additionally, in some embodiments, a non-gaze interaction such as a control button input, voice command/cue, and or hand or body gesture can assist, along with the gaze information, in determining whether to dismiss a message/notification. The message can be dismissed, minimized, maximized (e.g., upon dwell). This action could be for a predetermined period (e.g., minimize for 5 minutes). As a further embodiment, the message could be linked to a further action, for example display message "Low on fuel," and upon gaze, new options could appear "Navigate to nearest fuel station" and "Ignore," these options could be selected by gaze, spoken word, and/or other input such as button/control input.

As another example, the control system may receive information from the eye tracking device such as a user's gaze pattern or biometric data such as distance between eyes and iris size, and thus determine the identity of the user and control systems according to potentially predefined preferences of the user (otherwise known as user profile selection).

For example, illumination of items within the vehicle may be altered based upon a user gazing upon those items. Thus, for one particular user as detected by the system, a button may be illuminated when the user is gazing at it, or a display may be dimmed if a user is not gazing at it. In another example, the brightness of instrumentation illumination may be set based on which user profile is selected by the system. The control system may control these functions upon receiving or determining information defining the user's gaze direction.

In some embodiments, a control system may control systems based on a series or sequence of gaze directions. In this manner, the control system may analyze gaze directions over a period of time. This may be particularly useful for safety systems capable of being controlled by the control system. For example, the control system may determine based on a series of gaze directions that a user is desiring to control the vehicle to switch lanes, exit a highway, stop suddenly, etc. This may be due to the user gazing at items outside of the environment of the vehicle. Alternatively, the system may determine the user is not gazing at items outside the environment of the vehicle and is gazing at items inside the vehicle too frequently or for a prolonged period of time. Based on the gaze direction information, the control system may enact safety features of a vehicle such as braking systems, steering systems, accelerator limiting systems, and the like, to provide for a safer environment.

In some embodiments, gaze information may be used to override warning systems. For example, while a lane change warning may normally issue from a vehicle if inter-lane movement is detected, certain gaze information, such as the driver checking rear-view and side mirrors prior to lane movement may cause such alarms to be overridden (therefore reducing the number of false alarms). Further, the control system may also analyze input from sensors such as imaging sensors, thermal imaging sensors, infrared sensors, temperature sensors, and the like. This input may be used in combination with gaze direction information by the control system to determine relevant safety systems to control. In some scenarios the control system may control systems without notifying the user.

In the present disclosure, a gaze direction is used to describe a location at which a user is gazing or in other words looking, this may be a point upon a one-dimensional vector, a plane such as a display, and/or a point in three dimensional space.

In the present disclosure, any reference to an eye tracking device or similar device is intended to include any device capable of determining a user's gaze direction.

In the present disclosure, any reference to a computing system, control system, or the like, is intended to include a device containing processing capabilities for executing instructions.

In the present disclosure, any reference to a vehicle, moving vehicle, automobile, etc. is intended to include a vehicle capable of moving along a road, a rail, at sea, in air or space, and/or on or in other mediums. Merely by way of example, such vehicles may include personal transport devices (i.e., bikes, Segways™), scooters, motorcycles, cars, trucks, trains, boats, helicopters, planes, space vehicles, etc. In the present disclosure, activation of an input device may comprise voice activation. Voice may be detected by at least one microphone placed within the vehicle and connected to the control system. The at least on microphone may serve more than one purpose, for example it may also be utilized as part of a telephone system.

Any detail discussed herein with respect to one embodiment may or may not be present in all versions of that embodiment. Additionally, any detail discussed herein with respect to one embodiment may or may not be present in all versions of other embodiments discussed herein.

The computing device(s) or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter.

Figure 4:
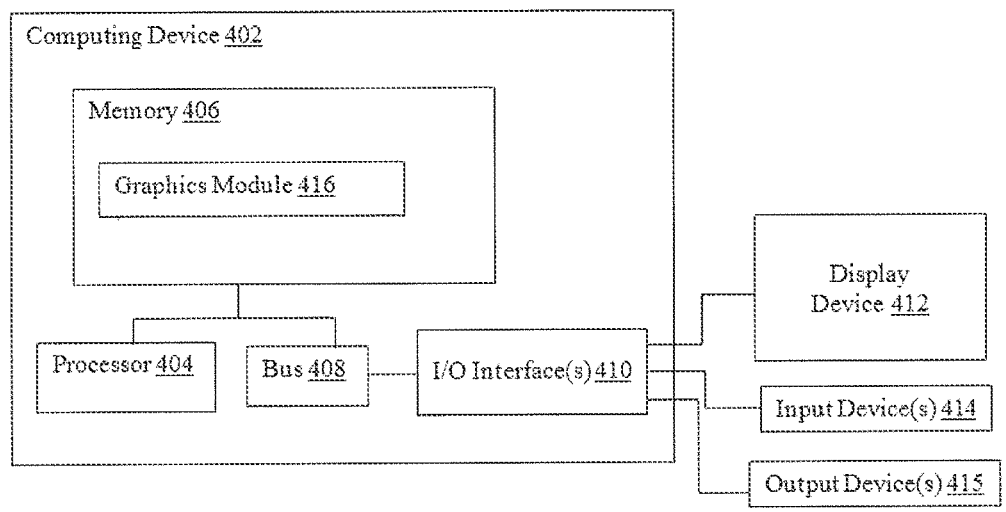
FIG. 4 shows a block diagram depicting an example computing device for implementing various embodiments discussed herein.

By way of example and not limitation, FIG. 4 is a block diagram depicting an example computing device 402 for implementing certain embodiments. The computing device 402 can include a processor 404 that is communicatively coupled to a memory 406 and that executes computer-executable program instructions and/or accesses information stored in the memory 406. The processor 404 may comprise a microprocessor, an application-specific integrated circuit ("ASIC"), a state machine, or other processing device. The processor 404 can include any of a number of computer processing devices, including one. Such a processor can include or may be in communication with a computer-readable medium storing instructions that, when executed by the processor 404, cause the processor to perform the steps described herein.

The computing device 402 can also include a bus 408. The bus 408 can communicatively couple one or more components of the computing system 402. The computing device 402 can also include and/or be communicatively coupled to a number of external or internal devices, such as input or output devices. For example, the computing device 402 is shown with an input/output ("I/O") interface 410, a display device 412, input device(s) 414 and output device(s) 415.

Non-limiting examples of a display device 412 include a screen integrated with the computing device 402, a monitor external and coupled with the computing system, etc. Non-limiting examples of input devices 414 include gaze detection devices (also referred to as eye tracking devices), touch screens, touch pads, external mouse devices, microphones and/or other devices mentioned herein, etc. A non-limiting example of an output device 415 is an audio speaker. In some embodiments, the display device 412, the input device(s) 414 and the output device(s) 415 can be separate devices. In other embodiments, the display device 412 and at least some of the input device(s) 414 can be integrated in the same device. For example, a display device 412 may be a screen and an input device 414 may be one or more components providing eye-tracking and/or touch-screen functions for the display device, such as emitters for emitting light and/or cameras for imaging a user's eye(s) and/or a touch area, etc. The screen, input device components and any output device components may be integrated within the same housing or in other integrated configurations.

The computing device 402 can modify, access, or otherwise use electronic content. The electronic content may be resident in any suitable non-transitory computer-readable medium and execute on any suitable processor. In one embodiment, the electronic content can reside in the memory 406 at the computing system 402. In another embodiment, the electronic content can be accessed by the computing system 402 from a remote content provider via a data network.

The memory 406 can include any suitable non-transitory computer-readable medium. A computer-readable medium may include, but is not limited to, electronic, optical, magnetic, or other storage device capable of providing a processor with computer-readable instructions or other program code. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may comprise processor-specific instructions generated by a compiler and/or an interpreter from code written in any suitable computer-programming language, including, for example, C, C++, C#, Visual Basic, Java, Python, Perl, JavaScript, and ActionScript.

A graphics module 416 stored in the memory 406 can configure the processor 404 to prepare electronic content for rendering in a graphical interface and/or render the electronic content in the graphical interface. In some embodiments, the graphics module 416 can be a stand-alone application executed by the processor 404. In other embodiments, the graphics module 416 can be a software module included in or accessible by a separate application executed by the processor 404 that is configured to modify, access, or otherwise use the electronic content.

It should be understood that the various methods described herein for interacting with and controlling computer devices and computer programs may be implemented by way of computer-readable instructions or other program code, which may have various different and alternative functional arrangements, processing flows, method steps, etc. Any suitable programming, scripting, or other type of language or combinations of languages may be used to implement the teachings contained herein in software to be used in programming or configuring a computing device.

Unless specifically stated otherwise, it is appreciated that throughout this specification discussions utilizing terms such as "processing," "computing," "calculating," "determining," and "identifying" or the like refer to actions or processes of a computing device. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Numerous specific details are set forth herein to provide a thorough understanding of the subject matter of the various embodiments. However, those skilled in the art will understand that such subject matter may be practiced without some or all of these specific details. In other instances, methods, apparatuses, or systems that would be known by one of ordinary skill have not been described in detail so as not to obscure claimed subject matter.

While the present subject matter has been described in some detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A method for changing information on a display in a vehicle based on a gaze direction of a driver, wherein the method comprises:
    displaying information on the display in the vehicle;
    receiving gaze data indicative of the gaze direction of the driver;
    determining a command has been received when the gaze direction of the driver is not located on an item displayed on the display, but is within a threshold distance of the item displayed on the display;
    changing operation of a vehicle subsystem associated with the item on the display based at least in part on the command being received;
    changing the display based at least in part on the gaze data by changing the shape and/or size of the information on the display when gaze data is received indicative of the driver gazing at, and then gazing away from, the information; and
    returning the information on the display to its original shape and/or size when gaze data is received indicative of the driver gazing at the information.

2. The method for changing information on a display in a vehicle based on a gaze direction of a driver of claim 1, wherein:
    changing the display is further based at least in part on receipt of a non-gaze input.

3. The method for changing information on a display in a vehicle based on a gaze direction of a driver of claim 1, wherein:
    the gaze data comprises data indicating the driver has gazed at the information on the display.

4. The method for changing information on a display in a vehicle based on a gaze direction of a driver of claim 3, wherein:
    the gaze data comprises data indicating the driver has gazed at the information on the display for at least a predetermined length of time.

5. The method for changing information on a display in a vehicle based on a gaze direction of a driver of claim 3, wherein:
    the gaze data comprises data indicating the driver has gazed at the information on the display in a particular pattern.

6. The method for changing information on a display in a vehicle based on a gaze direction of a driver of claim 5, wherein the particular pattern comprises:
    a movement of the driver's gaze from left to right over the information on the display.

7. The method for changing information on a display in a vehicle based on a gaze direction of a driver of claim 1, wherein:
    changing the display comprises removing the information from the display; and
    the method further comprises redisplaying the information on the display in the vehicle after a predetermined length of time has passed since removal of the information from the display.

8. The method for changing information on a display in a vehicle based on a gaze direction of a driver of claim 7, wherein the method further comprises:
    displaying new information related to the information.

9. The method for changing information on a display in a vehicle based on a gaze direction of a driver of claim 8, wherein:
    the new information is displayed immediately after removal of the information from the display.

10. The method for changing information on a display in a vehicle based on a gaze direction of a driver of claim 8, wherein:
    the new information is displayed upon receipt of an input from the driver, and wherein the input comprises a selection from a group consisting of: gaze data and at least one non-gaze input.

11. The method for changing information on a display in a vehicle based on a gaze direction of a driver of claim 1, wherein:
    the display comprises an instrument panel;
    the information comprises a light level of the instrument panel; and
    changing the display based at least in part on the gaze data comprises changing the light level of the instrument panel so that it is higher when the driver is gazing at the instrument panel than when the driver is gazing away from the instrument panel.

12. The method for changing information on a display in a vehicle based on a gaze direction of a driver of claim 11, wherein:
    the light level of the instrument panel is maintained at a higher level until gaze data is received affirmatively indicative of the driver not gazing at the instrument panel.

13. A non-transitory machine readable medium having instructions stored thereon for changing information on a display in a vehicle based on a gaze direction of a driver, the instructions executable by at least one processor for at least:
    displaying information on the display in the vehicle;
    receiving gaze data indicative of the gaze direction of the driver;
    determining a command has been received when the gaze direction of the driver is not located on an item displayed on the display, but is within a threshold distance of the item displayed on the display;
    changing operation of a vehicle subsystem associated with the item on the display based at least in part on the command being received;
    changing the display based at least in part on the gaze data by changing the shape and/or size of the information on the display when gaze data is received indicative of the driver gazing at, and then gazing away from, the information; and
    returning the information on the display to its original shape and/or size when gaze data is received indicative of the driver gazing at the information.

14. The non-transitory machine readable medium of claim 13, wherein:
    the gaze data comprises data indicating the driver has gazed at the information on the display.

15. The non-transitory machine readable medium of claim 13, wherein:
    the display comprises an instrument panel;
    the information comprises a light level of the instrument panel; and
    changing the display based at least in part on the gaze data comprises changing the light level of the instrument panel so that it is higher when the driver is gazing at the instrument panel than when the driver is gazing away from the instrument panel.

16. A system for changing information on a display in a vehicle based on a gaze direction of a driver, wherein the system comprises:

an eye tracking device for receiving gaze data indicative of the gaze direction of the driver; and a processor for:
  determining a command has been received when the gaze direction of the driver is not located on an item displayed on the display, but is within a threshold distance of the item displayed on the display;
  causing operation of a vehicle subsystem associated with the item on the display to be changed based at least in part on the command being received;
  changing the display based at least in part on the gaze data by changing the shape and/or size of the information on the display when gaze data is received indicative of the driver gazing at, and then gazing away from, the information; and
  returning the information on the display to its original shape and/or size when gaze data is received indicative of the driver gazing at the information.

17. The system for changing information on a display in a vehicle based on a gaze direction of a driver of claim 16, wherein:
  the display comprises an instrument panel;
  the information comprises a light level of the instrument panel; and
  changing the display based at least in part on the gaze data comprises changing the light level of the instrument panel so that it is higher when the driver is gazing at the instrument panel than when the driver is gazing away from the instrument panel.

* * * * *